Oct. 10, 1944.   R. W. SMITH   2,360,287
METHOD OF MAKING SPARK PLUGS
Filed Feb. 9, 1942

Inventor
Robert W. Smith
By Blackmore, Spencer & Hint
Attorneys

Patented Oct. 10, 1944

2,360,287

UNITED STATES PATENT OFFICE 2,360,287

METHOD OF MAKING SPARK PLUGS

Robert W. Smith, Flint, Mich., assignor to General Motors Corporation, Detroit, Mich., a corporation of Delaware Application February 9, 1942, Serial No. 430,059

6 Claims. (Cl. 29—25.12)

This invention relates to spark plugs and a method of manufacturing the same, particularly to the method of assembling a composite conductor element in the insulator of a spark plug used in aircraft.

It is an object of this invention to provide a method for the assembly of composite conductor elements in spark plug insulators in which the conductor element comprises an electrode and a terminal which are joined by an electrically conducting seal. The electrode itself comprises a shell of heat resisting material which is exposed to the hot gases in the combustion chamber and a core of a substance having a high heat conductivity. The improved manufacturing steps consist in assembling the component parts of the composite electrode loose in the insulator and in subjecting this loose assembly to a single heat treatment to soften the sealing material which joins the terminal and the electrode and to soften the bonding material which is used to join the high heat conductivity core of the electrode to the hollow shell. Pressure may be applied to the terminal to force the component parts into their positions of final assembly.

Figure 1:
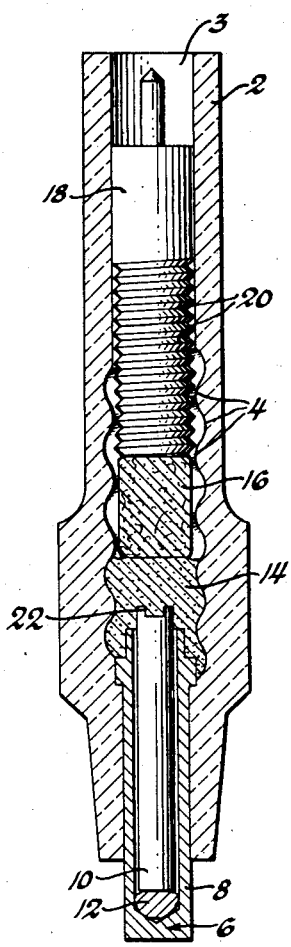
Figure 2:
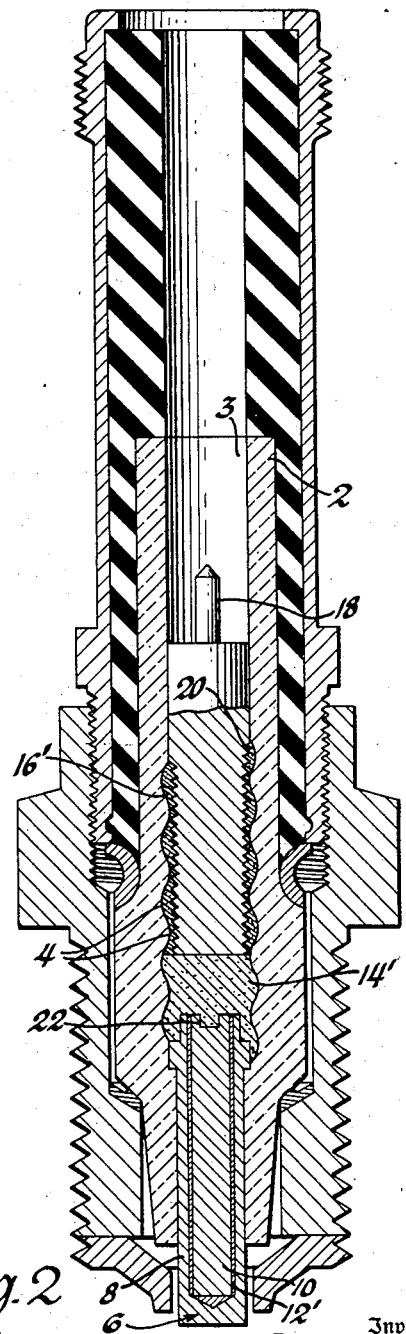

Figure 1 of the drawing shows a view in longitudinal section of the loose assembly above mentioned, and Figure 2 shows the finished plug in longitudinal section.

Referring particularly to Figure 1, 2 indicates an insulator of a suitable ceramic material such as the sintered oxide insulators known to the industry. Insulator 2 is provided with a longitudinal bore 3 which may have irregularities 4 intermediate its ends for a purpose to be described later. Disposed in bore 3 at the firing end of insulator 2 is an electrode indicated generally by 6. Electrode 6 comprises a hollow shell 8 of a suitable heat resistant alloy metal and a core 10 of a material having high heat conductivity, such as copper. Shell 8 and core 10 may be bonded together by any suitable bonding material such as solder, a pellet of which is indicated at 12. Also disposed in bore 3 adjacent electrode 6 is a sealing material 14 which is preferably a mixture of glass and a finely divided electrical conductor. Sealing material 14 may be provided in the form of a pellet which is crushed after it has been dropped into place. Adjacent sealing material 14 is a pellet of sealing material 16 which is a mixture of glass and a finely divided electrical conductor, but the glass of material 16 is preferably a glass having a greater plasticity than the glass of material 14. Specifically, the glass of material 14 may be a hard glass such as a borosilicate glass known as Pyrex, and the glass of material 16 may be a lead borosilicate glass. The composition of sealing material 14 and 16 is set forth in detail in U. S. Patent 2,248,415 to Schwartzwalder et al. A terminal 18 of a suitable electrical conductor such as steel is disposed in bore 3 adjacent sealing material 16. Terminal 18 may be provided with a roughened surface as indicated at 20 for a purpose hereinafter set forth.

In the practice of my invention, electrode 6 containing its quantity of bonding material 12 and its heat conducting core 10 is dropped into place in bore 3 of insulator 2. It will be understood, of course, that empty shell 8 may be dropped into place first after which bonding material 12 and core 10 may be put in place. It will usually be found more convenient, however, to put pellet 12 of the bonding material and core 10 in place in shell 8 before putting the electrode in place in the insulator. Sealing material 14 is then placed in the bore adjacent electrode 6. Preferably material 14 is provided in the form of a pellet of a predetermined size which may be crushed after it is put in place. Sealing material 16 is then put in place in the form of a pellet as shown in Figure 1, after which terminal 18 is disposed in bore 3 adjacent sealing material 16. The loose assembly comprising insulator 2 and the component parts of the composite conductor element consisting of electrode 6, sealing materials 14 and 16 and conductor 18 is then subjected to a heat treatment of a sufficiently high temperature to soften the bonding material 12 and the sealing materials 14 and 16. It will usually be found expedient to force the component parts of the conductor element into place by applying pressure to the upper end of conductor 18 while insulator 2 is held in any suitable support. Such pressure will cause the bonding material 12 to flow into position as indicated at 12' in Figure 2 to form a good heat and electrically conducting bond between shell 8 and core 10. Granular material 14 will be fused into the vitreous mass 14' of Fig. 2. The pressure on conductor 18 will force the conductor through the plastic mass of sealing material 16 until material 16 is extruded into the position as shown at 16' of Fig. 2. The irregularities 4 of the bore 3 and the roughened surface 20 of terminal 18 cooperate with sealing materials 14 and 16 to give mechanical strength to the final assembly. Electrode 6 consisting of shell 8 and core 10 may, if desired, be provided with a slot 22 to furnish resistance against rotation of electrode 6 in the insulator. The temperature to which the loose assembly is subjected should be sufficient to fuse or soften bonding material 12 and sealing materials 14 and 16. As described in the above mentioned Patent 2,248,415 to Schwartzwalder, this temperature may range from 1500° F. to nearly 1800° F. depending upon the composition of the sealing materials. The bonding material 12 will preferably be chosen so as to have a fusing temperature close enough to softening temperature of sealing materials 14 and 16 that they may both be softened in the one heat treatment.

I claim:

1. In spark plug manufacture, the steps of placing a hollow electrode in the insulator, the hollow of said electrode containing a bonding material and a core having high heat conductivity, placing a predetermined quantity of a sealing material in the insulator adjacent the hollow electrode, placing a terminal in the insulator adjacent the sealing material, heating the loose assembly to soften the bonding material and the sealing material, and thereafter applying pressure to move the terminal toward the hollow electrode into final position, said pressure causing the bonding and sealing materials to flow into place between the respective parts.

2. In the manufacture of spark plugs, the process of assembling a conductor element in an insulator comprising the steps of placing a hollow electrode in the insulator, placing a predetermined quantity of solder along with a metallic core into the hollow electrode, placing a predetermined quantity of sealing material into the insulator adjacent the hollow electrode, placing a terminal into the insulator adjacent the sealing material, heating the loose assembly to soften the solder and the sealing material, and thereafter applying pressure to move the terminal toward the hollow electrode into final position, said pressure causing the bonding and sealing materials to flow into place between the respective parts.

3. In spark plug manufacture, the steps of placing a hollow electrode in the longitudinal bore of an insulator, the hollow of said electrode containing a bonding material and a core having high heat conductivity, placing a predetermined quantity of a glass sealing material in the insulator adjacent the hollow electrode, placing a terminal in the insulator adjacent the sealing material, heating the loose assembly to soften the bonding material and the sealing material, and thereafter pressing the terminal into the insulator to force the core, bonding material and sealing material into place.

4. In spark plug manufacture, placing a bonding material and a core having high heat conductivity into a hollow electrode, putting said electrode into an insulator, placing a predetermined quantity of a sealing material in the insulator adjacent the electrode, placing a predetermined quantity of a second sealing material adjacent the first, the second sealing material having greater plasticity than the first, placing a terminal in the insulator adjacent the second quantity of sealing material, heating the loose assembly to soften the bonding material and the two sealing materials, and thereafter applying pressure to move the terminal toward the hollow electrode into final position, said pressure causing the bonding and sealing materials to flow into place between the respective parts.

5. In spark plug manufacture, placing a bonding material and a heat conducting core into a hollow electrode, putting said electrode into the bore of an insulator at its firing end, placing a predetermined quantity of a mixture of borosilicate glass and a finely divided electrical conductor into said bore adjacent the electrode, placing a predetermined quantity of a mixture of lead borosilicate glass and a finely divided electrical conductor into said bore adjacent said first glass-conductor mixture, placing a conducting terminal in said bore adjacent the second glass-conductor mixture, heating the loose assembly to fuse or soften the bonding material and the glass, and forcing the component parts into place by pressure after the bonding material and glass are fused or softened.

6. The method of making a spark plug which includes providing a spark plug insulator having a bore extending longitudinally therethrough, placing in said bore adjacent one end thereof a hollow metallic electrode having a closed end, said hollow metallic electrode being of heat resistant material, placing in the hollow electrode a small amount of solder in solid form, inserting a metal core having high heat conductivity in the hollow metallic electrode above the solder, placing in the bore of said insulator and above the hollow electrode a sealing material in solid form, said sealing material including glass and a finely divided electrical conducting material, inserting a conducting terminal in the bore of the insulator above said sealing material, heating the assembly of parts until the solder is melted and the sealing material is fused or softened, and thereafter applying pressure to force the conducting terminal toward the hollow metallic electrode and core into final assembled position, said pressure causing the molten solder to flow upwardly between the hollow metallic electrode and core and forcing the softened or fused sealing material into intimate contact with the terminal, electrode, core and bore.

ROBERT W. SMITH.